J. COBLEIGH.
Combined Scales and Dumping Platforms.

No. 134,034. Patented Dec. 17, 1872.

UNITED STATES PATENT OFFICE.

JAMES COBLEIGH, OF MORRISON, ILLINOIS, ASSIGNOR OF ONE-HALF HIS RIGHT TO EDWARD B. WARNER, OF SAME PLACE.

IMPROVEMENT IN COMBINED SCALES AND DUMPING-PLATFORMS.

Specification forming part of Letters Patent No. 134,034, dated December 17, 1872.

*To all whom it may concern:*

Be it known that I, JAMES COBLEIGH, of Morrison, in the county of Whitesides and in the State of Illinois, have invented certain new and useful Improvements in Combined Scales and Dumping-Platform; and do hereby declare that the following is a full, clear, and exact description thereof, reference being had to the accompanying drawing and to the letters of reference marked thereon making a part of this specification.

The nature of my invention consists in combining a dump with the platform of grain or wagon or railroad scales in such a manner that wagons, sleighs, or other vehicles or cars loaded with bulk grain can be weighed, the contents dumped into a conveniently-arranged hopper and chute below, and the empty vehicle or car weighed without removing the same from the platform of the scales.

In order to enable others skilled in the art to which my invention appertains to make and use the same, I will now proceed to describe its construction and operation, referring to the annexed drawing, in which—

Figure 1:
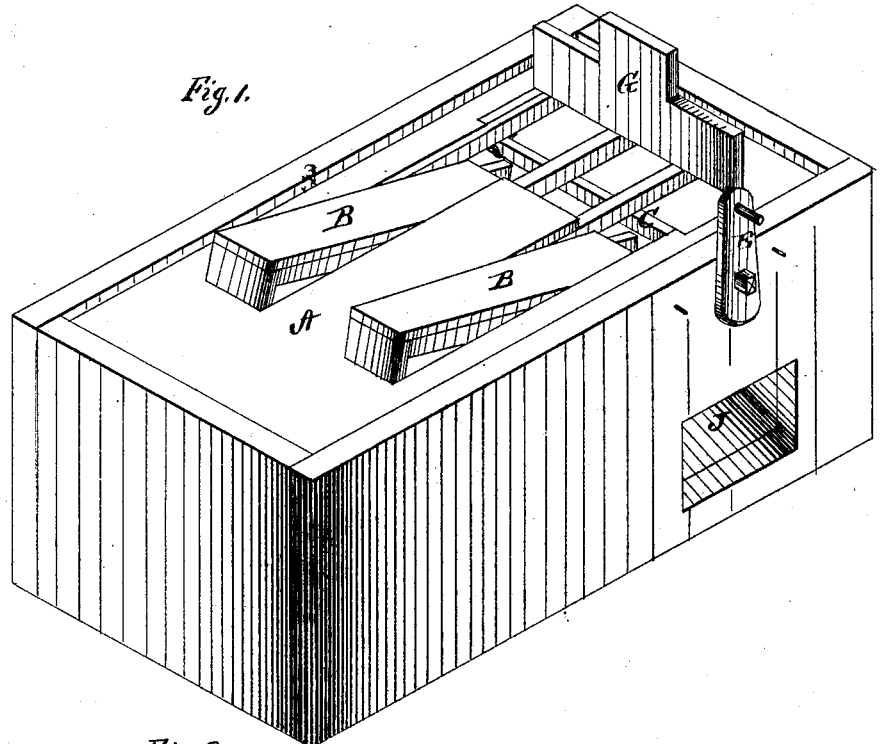
Figure 2:
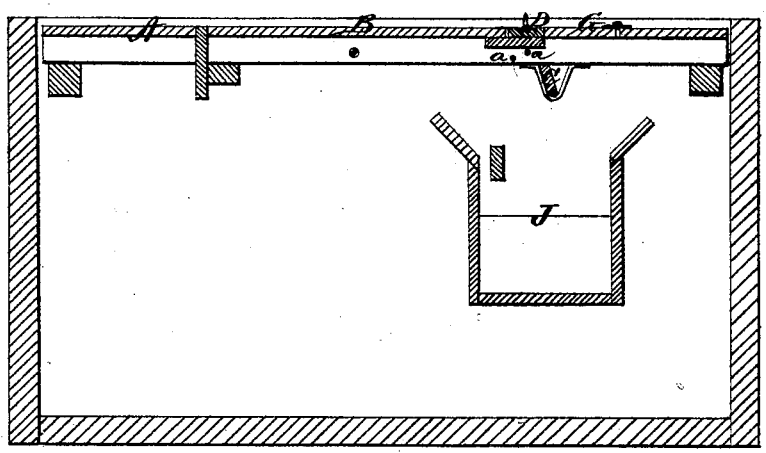

Figure 1 is a perspective view, and Fig. 2 a longitudinal vertical section, of a scale-platform with my invention attached thereto.

A represents the platform of a grain or wagon scale or railroad scale. This platform may be balanced and arranged in any of the known and usual ways for such scales, and as I lay no claim to any other part of the scale I have not deemed it necessary to represent the same in the drawing. In this platform are formed two dumping-platforms, B B, at such distances apart that in driving a wagon or other vehicle on the scale the wheels will come on said dumping-platforms. In a railroad scale the dumping-platforms should be long enough that the entire car may rest on the same. The rear ends of the dumping-platforms B B rest on a pivoted bar, C, provided at its outer end with a handle, E, for turning.

In the rear end of each of the platforms B is a movable piece, D, which may be placed in a perpendicular position between rods *a a* to form a rest for the wheels. In the main platform A, in rear of the dumping-platforms B B, is formed a door, G, under which is arranged a hopper and chute, J.

In weighing and unloading grain, the wagon or car or other vehicle will pass onto the platform of the scales over the receiving-door G, and the wheels will stop upon the dumping-platforms B B; the load is then weighed, and both the wheel-rests D D are raised from their positions and adjusted perpendicularly. The receiving-door G is then opened, the end board of the wagon taken out, the safety-bar C is turned by a slight pressure on the handle E, when the contents of the wagon will be dumped into the hopper below. A slight forward movement of the team readjusts the dumping-platforms B B, the empty wagon is weighed and driven off, and the wheel-rests D D, receiving-door G, and safety-bar C are put back in their places.

Having thus fully described my invention, what I claim as new, and desire to secure by Letters Patent, is—

1. The wheel-rests D D, forming part of the dumping-platforms B B, arranged in and forming part of the platform of a scale, substantially as and for the purposes herein set forth.

2. The combination, with the platform of a scale, of the dumping-platforms B B with wheel-rests D D and safety-bar C, the receiving-door G, and hopper and chute J, all constructed and arranged substantially as and for the purposes herein set forth.

In testimony that I claim the foregoing I have hereunto set my hand this 4th day of September, 1872.

JAMES COBLEIGH.

Witnesses:
 WILLIAM CLENDENIN,
 AARON H. MARTIN.